April 20, 1926.  1,581,554
F. SOLTAU
METHOD OF ELIMINATING DANGEROUS VIBRATION PERIODS IN SHIPS' PROPELLER SHAFTS
Filed March 13, 1923

Inventor:
Friedrich Soltau,
By Knight Bros.
Attys.

Patented Apr. 20, 1926.

1,581,554

UNITED STATES PATENT OFFICE.

FRIEDRICH SOLTAU, OF KIEL, GERMANY, ASSIGNOR TO FRIED. KRUPP AKTIEN-GESELLSCHAFT GERMANIAWERFT, OF KIEL-GAARDEN, GERMANY.

METHOD OF ELIMINATING DANGEROUS VIBRATION PERIODS IN SHIPS' PROPELLER SHAFTS.

Application filed March 13, 1923. Serial No. 624,875.

*To all whom it may concern:*

Be it known that I, FRIEDRICH SOLTAU, residing at 4 Geibelplatz, Kiel, Germany, a citizen of the German Republic, have invented a certain new and useful Improvement in Methods of Eliminating Dangerous Vibration Periods in Ships' Propeller Shafts, of which the following is a specification.

It is a well-known fact that the propeller shafts of ships which are driven by internal combustion engines are subjected to dangerous resonance phenomena of torsional vibrations which are produced as soon as the number of periods of the variations of force in the tangential pressure diagram of the engine becomes equal or approximately equal to the number of the natural vibration of the whole system which substantially comprises the propeller shaft, forming the elastic connection, the driving gear of the engine and the fly-wheel and propeller forming the vibrating masses. The speeds at which these dangerous resonance phenomena may occur, are called critical speeds, as is known. By the term critical speed is meant therefor a number which denotes both the number of natural vibrations per unit of time and also the number of revolutions of the shaft per unit of time equal thereto. According to the manner, in which the system vibrates, whether with one, two or more vibration nodes, one generally uses the term critical speed of the first ($n^1$) second ($n^{11}$) and higher order. As in every revolution of the shaft a plurality of impulses of vibration is exerted upon it by the driving engine according to the number of cylinders of the latter, the above-mentioned resonance phenomena already will occur with speeds amounting an integral fraction of the critical speeds $n^1$, $n^{11}$ etc., only, these critical speeds being called critical speed of the second ($n_2$), third ($n_3$) etc. degree. With a six-cylinder four stroke motor for instance, as experience and analysis of the tangential pressure diagram proves, the critical speeds of the first order, third degree ($n^1_3$) and second order, sixth degree ($n^{11}_6$), amounting only one-third and one sixth, respectively, of the speeds $n^1$, $n^{11}$, are found particularly troublesome. Now, as in driving ships by internal combustion engines, the critical speeds lie at very low numbers of revolution due to the long elastic shafting, to the heavy masses of the gear parts and to the great number of cylinders of the driving engine, several of these critical speeds generally will fall into the speed range of the engine, since the R. P. M. of ships' engines must be varied over wide limits.

The present invention has for its object to set the speed range required outside the critical speeds by raising the numbers of the natural vibrations corresponding to the critical speeds as high as possible, whereby at the same time the interval between those two critical speeds of the same order but of different degrees, between which the speed range of the engine is lying, is enlarged, and furthermore by reducing the number of natural vibration corresponding to any critical speed of a higher order that may still be present in the said speed range so as to coincide with the number of the natural vibration corresponding to the critical speed of the next lower order of the same degree. This object is attained according to the invention, without any increased expense in material, for instance, by thickening the propeller shaft or disposing additional fly-masses, solely by arranging the fly-wheel at that nodal point (S, Fig. 3) which would be produced in the shaft if no fly-wheel were present. In the latter case in consequence of the absence of vibrating masses the number of natural vibration of the system, viz, that corresponding to the critical speed of the first order, will have its greatest possible value, and this is not changed by arranging the fly-wheel at the nodal point of the shaft, since the mass of the fly-wheel itself does not execute any amplitude of vibration. Therefore when arranging the fly-wheel at the nodal point of the shaft instead of at another point the critical speed of the first order will have its greatest possible value so that the shaft may be kept comparatively thin. At every other point of the shaft, however, the mass of the fly-wheel would take part in the vibration of the shaft and thereby reduce the number of natural vibration of the entire system and at the same time its critical speed. The said nodal point of the shaft is determined by the known condition of: $l^1 = m^1 = l^2 m^2$, with which $m^1$ and $m^2$ designate the masses of inertia of the engine and propeller, respectively, and $l^1$ and $l^2$ the elastic lengths of the shaft between these masses and the nodal point. In order to calculate the elastic length of the shafting, the several shaft sections are reduced to a certain uniform diameter in a well-known manner.

The arrangement of the fly-wheel on the shafting involves however, the possibility of a critical speed of the second order $n^{11}$ the curve of vibration of the shaft having two nodal points ($S^1$ and $S^2$, Fig. 4), this critical speed being usually so low that it coincides with a number of revolutions in the speed range of the engine. In order to displace this critical speed, according to the invention the fly-wheel is not itself rigidly arranged at the nodal point (S, Fig. 3) which would arise with a plant without fly-wheel, but connected with the latter through the intermediary of an elastic hollow shaft or equivalent elastic means. By the use of this intermediate shaft the number of natural vibration corresponding to the critical speed $n^{11}$ is lowered, owing to the increased elasticity of the shaft and the nodal points $S^1$ and $S^2$ of the curve of vibration then approach each other while the number of natural vibration corresponding to the critical speed $n^1$ is not influenced by the elasticity of said intermediate shaft, as in the curve of vibration of the first order (Fig. 1) the intermediate shaft is attached at the nodal point and, therefore, is not subjected to any excitation of vibration. By suitably dimensioning the intermediate shaft, it can further have such an elasticity that the number of natural vibration corresponding to the critical speed $n^{11}$ will be equal to that corresponding to the critical speed $n^1$. As a simple reflection proves this will be the case if the condition is fulfilled namely that the product of the elastic length $l^3$ between the fly-wheel and nodal point and the mass $m^3$ of the fly-wheel is equal to the product of the two other masses and the corresponding elastic lengths, which means that the condition of: $l^1 \cdot m^1 = l^2 \cdot m^2 = l^3 \cdot m^3$ is fulfilled.

As can be proved by calculation and test, it is attained by the fulfillment of the said condition that the nodal point of the curve of vibration of the shaft is not displaced and that numbers of natural vibration corresponding to the critical speeds of the $1^{st}$ and $11^{nd}$ order $n^1$ and $n^{11}$ will, indeed, adopt equal values. This peculiar result can only be attained by the described arrangement of the fly-wheel and the equivalence of the products. It has, however, the effect that the critical speed of $11^{nd}$ order situated in the speed range of the engine and being mostly of a particularly disturbant kind is completely removed in a perfect manner.

In order to allow of the invention to be more readily understood, an example of the same will now be described in detail, the numeral figures being taken from actual practice, and in the accompanying drawings.

Figure 1:
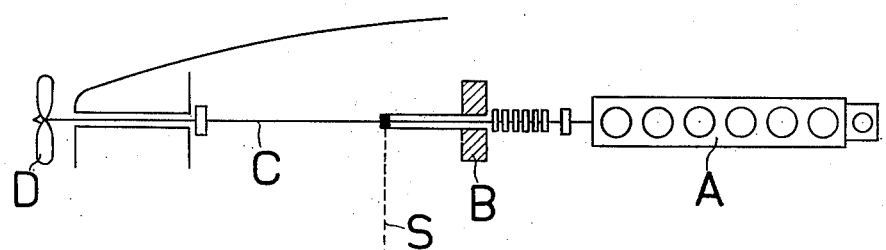
Fig. 1 is a diagrammatical representation of a ship's propeller plant.
Figure 2:
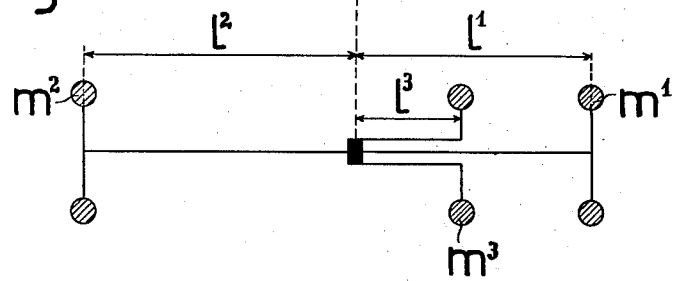
Fig. 2 is a diagram of the same plant, the length of the several shaft sections being reduced, in a well known manner, the same shaft diameter, and Figs. 3 and 4 representations of different vibrational motions of the propeller shaft.
Figure 3:
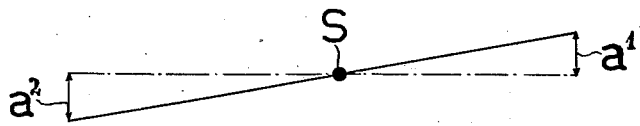

It is assumed that the propeller of a ship is driven by means of a single acting six-cylinder engine of the four-stroke type having a speed of $n = 115$. A plant of this character is diagrammatically illustrated in Fig. 1 of the drawing in which A denotes the engine, B the fly-wheel, C the propeller shaft and D the propeller. Assuming, first that the plant is working without a fly-wheel, the system will have a period of natural vibration of 420 vibrations per minute. Under these conditions and in accordance with the number of cylinders and the four-stroke type, the critical speeds of the $6^{th}$ and $3^{rd}$ degree may be very marked, as experience has shown, which means that the much feared resonance will occur at $\dfrac{420}{6} = 70$ and $\dfrac{420}{3} = 140$ revolutions of the engine. The curve of vibration of the shaft which corresponds to the arrangement without fly-wheel, is illustrated by Fig. 3. It is to be seen from the same that the curve of vibration possesses one nodal point S which, as well-known, does not take part in the vibration amplitudes of the shaft; $a^1$ and $a^2$ represent the the amplitudes of vibration of the masses $m^1$ and $m^2$, respectively. By means of the arrangement of the fly wheel at the nodal point S the critical speed of the $1^{st}$ order will reach its highest value, and thereby the vibrationless range of the engine, which lies between the critical speed of the $1^{st}$ order $6^{th}$ degree and that of the $1^{st}$ order $3^{rd}$ degree, will on the one hand be heightened, and on the other hand, broadened, as far as possible. Because were the fly-wheel to be connected to the shaft in the manner hitherto usual, the mass of the fly-wheel would reduce the natural vibration number, which corresponds to the critical speed of the first order, to about 360, so that the dreaded resonance vibrations would arise at the speeds $\dfrac{360}{6} = 60$ and $\dfrac{360}{3} = 120$.

The number of revolutions made by the engine when maneuvering would therefore have always to lie between 120 and 60. Now as the propeller shaft is intended to make 115 revolutions at normal speed, the shaft would be subjected to violent vibrations every time the propeller came out of the water in a stormy sea thereby causing the number of revolutions made by the shaft to increase, and the critical speed $n^I{}_3 = 120$ would be very rapidly attained. If on the contrary the fly-wheel instead of being placed next to the engine be placed at the nodal point S as shown in Fig. 3, the critical speeds will lie as stated at 70 and 140 revolutions. The range of speed of the shaft which is free from resonance vibrations, has therefore risen from 60 to 120 to from 70 to 140. The normal number of revolutions made by the shaft, i. e. 115 revolutions per minute, must therefore rise by 25 revolutions before resonance vibrations arise. This increase in the number of revolutions would however take some considerable amount of time to develop so that it can very conveniently be prevented by means of a regulating device. Placing the fly-wheel at the nodal point S consequently ensures the great advantage that the vibration free speed range lies on the one hand as much higher as possible and on the other hand is increased.

Figure 4:
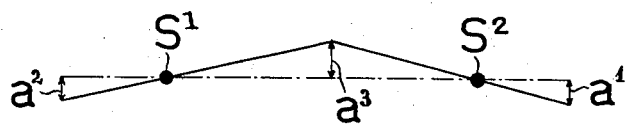

By the arrangement of the fly-wheel on the shaft, there is further produced a curve of vibration with the two nodal points $S^1$, $S^2$ as shown in Fig. 4, and the period of natural vibrations corresponding to the critical speed $n^{II}$ is equal, as calculation proves, to about 600 vibrations per minute. Therefore in the present case, especially the critical speed of the 11$^{nd}$ order 6$^{th}$ degree $$n^{II} = \frac{600}{6} = 100$$

will cause a disturbing action, since it lies in the speed range of the engine which is assumed to exist between 75 and 130 revolutions, while the critical speed of the 11$^{nd}$ order 3$^{rd}$ degree, $n^{II}{}_3 = \frac{600}{3} = 200$, does not come into question, as the engine does not run at so high a speed. In order to remove this disturbing critical speed of the 11$^{nd}$ order 6$^{th}$ degree $n^{II}{}_n = 100$, from the speed range between the two critical speeds $n^I{}_6 = 70$ and $n^I{}_3 = 140$, the fly-wheel is connected to the propeller shaft by means of a hollow shaft in the manner to be seen from Fig. 1, the connection being such as to fulfil the conditions of the equality of the products of the masses and elastic lengths of the three masses. The nodal points $S^1$ and $S^2$ of Fig. 4 are thereby caused to coincide and unite in the nodal point S of the plant without fly-wheel (Fig. 3), which means that the critical speed of the 11$^{nd}$ order 6$^{th}$ degree coincides with the critical speed of the 1$^{st}$ order 6$^{th}$ degree and is therefore completely removed from the speed range of the engine.

The invention may equally well be used for obtaining the coinciding of two succeeding numbers of natural vibrations of a higher order (for instance 111$^{rd}$ and IV$^{th}$ order); besides, instead of one fly-wheel a plurality of masses may be arranged at any suitable nodal point inasmuch as the abovesaid condition for the product of mass and elastic length between mass and nodal point is fulfilled with regard to every single mass.

Having now particularly described and ascertained the nature of my said invention and in what manner the same is to be performed, I declare that what I claim is:—

1. In a ship propelling system comprising an internal combustion engine, a propeller and a drive shaft connecting said engine and propeller, the combination of a flywheel elastically connected to the natural nodal point of said shaft, the product of the mass of said fly-wheel and the elastic length between said fly-wheel and said nodal point being equal to the product of the mass of said propeller and the elastic length between said propeller and said nodal point, and to the product of the mass of said engine and the elastic length between said engine and said nodal point as and for the purpose described.

2. In a ship propelling system comprising an internal combustion engine, a propeller and a drive shaft connecting said engine and propeller, the combination of a flywheel and a hollow shaft for elastically connecting said fly-wheel to the natural nodal point of said drive shaft, the product of the mass of said fly-wheel and the elastic length between said fly-wheel and said nodal point being equal to the product of the mass of said propeller and the elastic length between said propeller and said nodal point, and to the product of the mass of said engine and the elastic length between said engine and said nodal point as and for the purpose described.

The foregoing specification signed at Cologne, Germany, this 14th day of February, 1923.

FRIEDRICH SOLTAU.